United States Patent
Hawes et al.

(10) Patent No.: US 7,438,152 B2
(45) Date of Patent: Oct. 21, 2008

(54) AIRFLOW SENSING METHOD AND APPARATUS FOR IMPACT DETECTION

(75) Inventors: Kevin J. Hawes, Greentown, IN (US); Scott A. Pagington, Greentown, IN (US); Junqiang Shen, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 411 days.

(21) Appl. No.: 11/174,162

(22) Filed: Jun. 30, 2005

(65) Prior Publication Data

US 2007/0000710 A1      Jan. 4, 2007

(51) Int. Cl.
B60R 21/0136 (2006.01)

(52) U.S. Cl. .................... 180/274; 280/735; 73/1.16

(58) Field of Classification Search ........... 180/274, 180/282, 271; 280/735; 73/1.16, 11.01, 73/12.01, 861.02, 861.08, 202.5, 204.11, 73/204.16, 204.17; 340/436
See application file for complete search history.

(56) References Cited

U.S. PATENT DOCUMENTS

| | | | |
|---|---|---|---|
| 3,654,412 A | 4/1972 | Haruna et al. | |
| 5,748,075 A | 5/1998 | Dirmeyer et al. | |
| 7,025,163 B2 * | 4/2006 | Fuertsch et al. | 180/274 |
| 2003/0212510 A1 | 11/2003 | Gee | |
| 2004/0099462 A1 * | 5/2004 | Fuertsch et al. | 180/274 |
| 2007/0001436 A1 * | 1/2007 | Hawes et al. | 280/735 |
| 2007/0090931 A1 * | 4/2007 | Hawes et al. | 340/436 |
| 2007/0103283 A1 * | 5/2007 | Nonaka et al. | 340/436 |

FOREIGN PATENT DOCUMENTS

| | | |
|---|---|---|
| DE | 4128448 | 3/1993 |
| DE | 10345727 | 4/2005 |
| EP | 1350683 | 10/2003 |
| GB | 1536015 | 12/1978 |
| WO | 02/083462 | 10/2002 |

OTHER PUBLICATIONS

EP Search Report dated Apr. 11, 2007.
European Search Report dated Oct. 13, 2006.

* cited by examiner

*Primary Examiner*—Ruth Ilan
*Assistant Examiner*—Drew J. Brown
(74) *Attorney, Agent, or Firm*—Douglas D. Fekete

(57) ABSTRACT

Impacts with a vehicle body panel are detected by sensing airflow inboard of the vehicle body panel. The airflow can be measured by heated element sensor, a Pitot tube sensor, a venturi sensor or other airflow-responsive sensor. For side impact detection, the sensor is located in a door or pillar on the side of the vehicle; for frontal impact detection, the sensor may be located behind the front bumper. Multiple sensors mounted in distributed locations can be used to determine the location and extent of an impact.

10 Claims, 5 Drawing Sheets

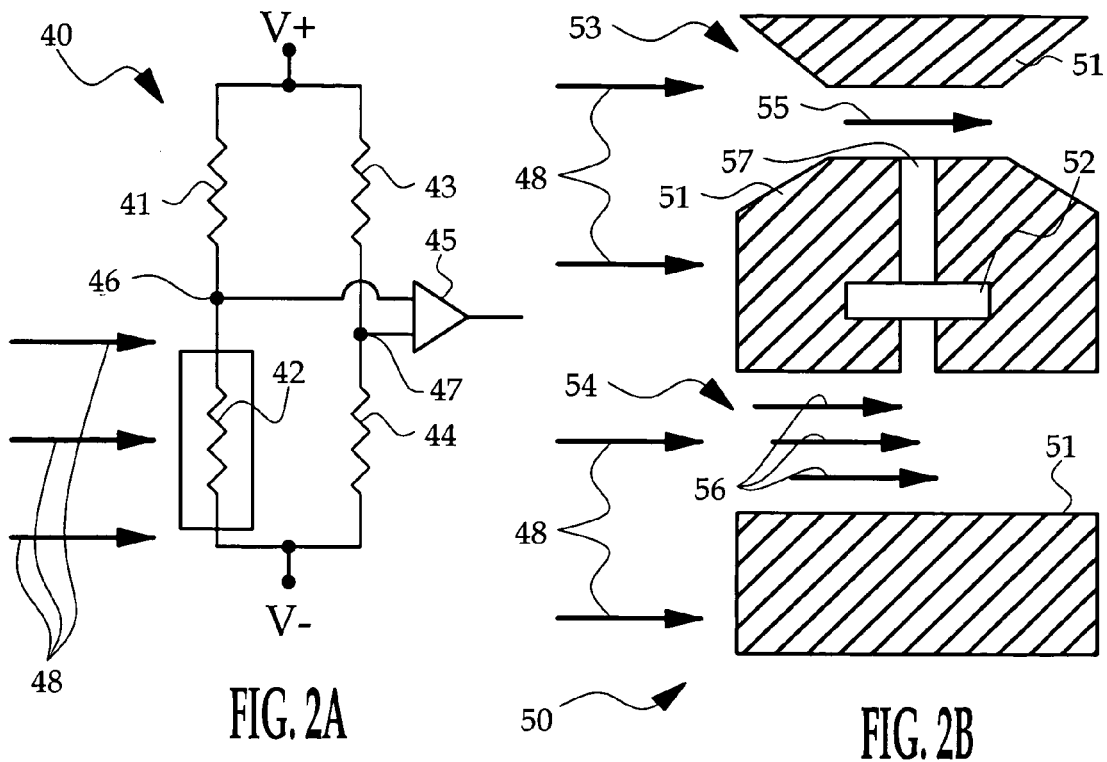
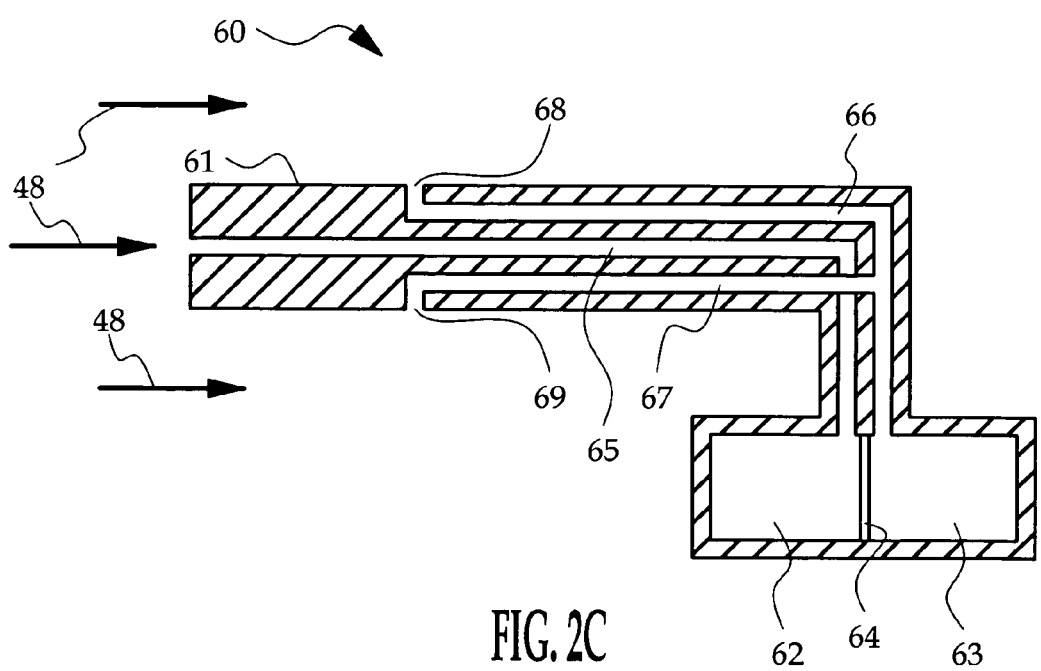

AIRFLOW SENSING METHOD AND APPARATUS FOR IMPACT DETECTION

TECHNICAL FIELD

The present invention relates to impact detection in motor vehicles, and more particularly to a method and apparatus for detecting an impact based on airflow inboard of a vehicle body panel due to the impact.

BACKGROUND OF THE INVENTION

Accelerometers have traditionally been used to detect and analyze vehicle impacts for purposes of determining if, when, and how forcefully to deploy supplemental restraints such as air bags. Various alternative impact sensing strategies have been proposed, particularly for side impact sensing. See, for example, the U.S. Pat. No. 5,748,075 to Dirmeyer et al. where a pressure sensor is used to detect a sudden rise in pressure within an enclosed hollow body such as side door; and the U.S. Pat. No. 3,654,412 to Haruna et al. where a plunger-type sensor is used to detect deformation of a body panel. However, the alternative sensing approaches that are capable of very early impact detection also tend to produce crash-like signals during non-crash events such as when the vehicle door or bumper is struck by a hammer or bicycle, for example. And the alternative sensing approaches that are capable of reliably discriminating a crash event usually result in no earlier crash event detection than traditional sensing approaches. Accordingly, what is desired is a crash sensing strategy and apparatus for detecting vehicle impacts both quickly and reliably.

SUMMARY OF THE INVENTION

The present invention is directed to an improved impact sensing method and apparatus where airflow inboard of a vehicle body panel is measured to detect a crash event. The airflow can be measured by heated element sensor, a Pitot tube sensor, a venturi sensor or other airflow-responsive sensor. For side impact detection, the sensor is located in a door or pillar on the side of the vehicle; for frontal impact detection, the sensor may be located behind the front bumper. Multiple sensors mounted in distributed locations can be used to determine the location and extent of an impact.

BRIEF DESCRIPTION OF THE DRAWINGS

FIG. 2A is a diagram of a heated element airflow sensor for use in the vehicle of FIG. 1;

FIG. 2B is a diagram of a venturi airflow sensor for use in the vehicle of FIG. 1;

FIG. 2C is a diagram of a Pitot tube airflow sensor for use in the vehicle of FIG. 1;

DESCRIPTION OF THE PREFERRED EMBODIMENT

Figure 1:
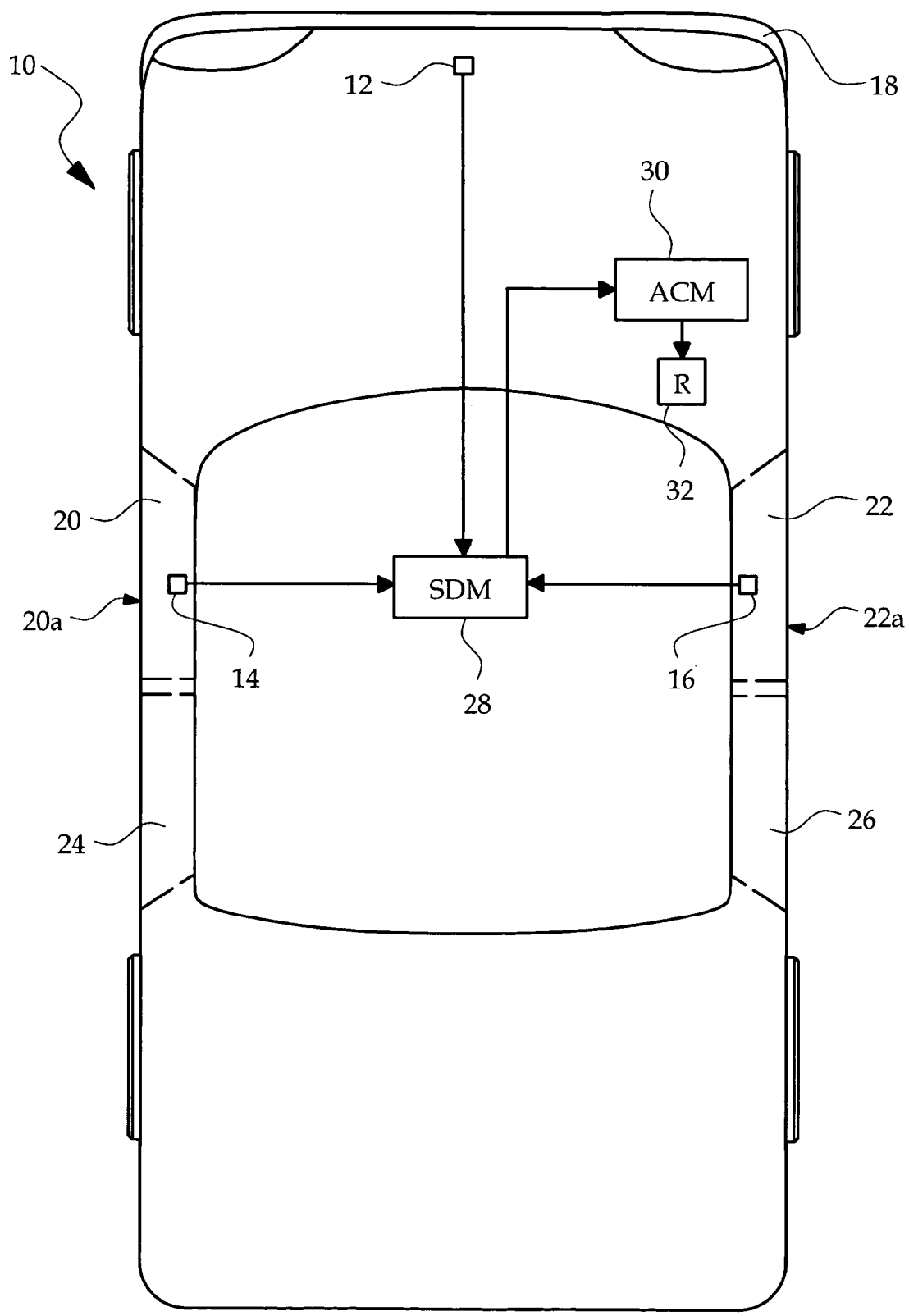
FIG. 1 is a diagram of a vehicle equipped with an impact sensing apparatus according to this invention.

Referring to FIG. 1, the reference numeral 10 generally designates a vehicle equipped with airflow sensors 12, 14, 16 for detecting frontal and side impacts. The frontal impact sensor 12 is located inboard of the front bumper 18, while the side impact sensors 14, 16 are located in the front side doors 20, 22 inboard of the exterior door panels 20a, 22a. Of course, impact sensors may additionally be placed in the rear side doors 24, 26 if desired. The signals produced by the sensors 12, 14, 16 are supplied to a microprocessor-based sensing and diagnostic module (SDM) 28, which detects the occurrence, location and severity of a crash event. For example, the onset of a crash event can be detected when the measured airflow exceeds a calibrated threshold, and the severity of the crash event can be subsequently determined based on the integral of the measured airflow or its rate of change. If deployment of supplemental restraints such as airbags is deemed to be warranted, the SDM 28 issues one or more deployment commands to an airbag control module (ACM) 30, which deploys the corresponding restraints, designated in FIG. 1 by the block (R) 32. In a typical application, the SDM 28 will be located in a central region of the vehicle 10, and will include one or more internal safing sensors such as accelerometers for independently verifying impacts registered by the airflow sensors 12, 14, 16.

When an exterior vehicle body panel such as the bumper 18 or the door panels 20a, 22a of side doors 20, 22 is struck by an object, the body panel deflects inward. The inward deflection produces compression and inward displacement of air inboard of the body panel, and the sensors 12, 14, 16 produce signals responsive to the airflow. FIGS. 2A-2C depict three examples of suitable airflow sensors. FIG. 2A depicts a heated element sensor 40; FIG. 2B depicts a venturi sensor 50; and FIG. 2C depicts a Pitot tube sensor 60.

Referring to FIG. 2A, the heated element sensor 40 comprises four resistors 41, 42, 43, 44 configured in a conventional Wheatstone bridge arrangement and a differential amplifier 45 responsive to the potential difference between the bridge nodes 46 and 47. The amplifier 45 adjusts the bridge voltage (Vout) as required to balance the bridge. The resistors 41-44 are selected so that when the bridge is balanced, the resistor 42 (which may be a wire, for example) is maintained at an elevated temperature such as 250° C. The resistor 42 is positioned adjacent to a body panel such as bumper 18 or door panels 20a, 22a so that transient airflow (as represented by the arrows 48) due to deflection of the body panel in a crash event displaces the heated air surrounding the resistor 42 with air at essentially ambient temperature. This cools the resistor 42 and the amplifier 45 responds by increasing the bridge voltage. In this way, the amplifier output voltage Vout provides a measure of the magnitude of the airflow across resistor 42.

Referring to FIG. 2B, the venturi sensor 50 has a sensor body 51 and a differential pressure sensor 52, such as a silicon diaphragm sensor. The sensor body 51 is located adjacent a body panel (such as bumper 18 or door panels 20a, 22a) and is configured to define restricted and unrestricted airflow ports 53, 54 that are in-line with the transient air airflow (designated by arrows 48) produced by a body panel impact. The pressure sensor 52 is disposed in a passage 57 extending between the airflow ports 53, 54, and the difference between the airflow in restricted airflow port 53 (designated by arrow 55) and the airflow in unrestricted airflow port 54 (designated by arrows 56) produces a corresponding pressure difference across the sensor 52. The sensor 52 produces a signal corresponding to the pressure difference, which is also an indication of the magnitude of the impact-related transient airflow.

Referring to FIG. 2C, the Pitot tube sensor 60 has a sensor body 61, first and second pressure chambers 62, 63 and a differential pressure sensor 64 separating the pressure chambers 62 and 63. The sensor body 61 is located adjacent a body panel (such as bumper 18 or door panels 20a, 22a) and defines a central air passage 65 having an inlet 66 that is in-line with the transient air airflow (designated by arrows 48) produced by a body panel impact, and one or more static air passages 66, 67 having inlets 68, 69 that are perpendicular to the impact-related airflow. The central air passage 65 is coupled to the first pressure chamber 62, while the static air passages 66, 67 are coupled to the second pressure chamber 63. The sensor 64 is responsive to the difference in pressures between the first and second chambers 62, 63, and such difference provides a measure of velocity of the impact-related transient airflow.

Figure 3:
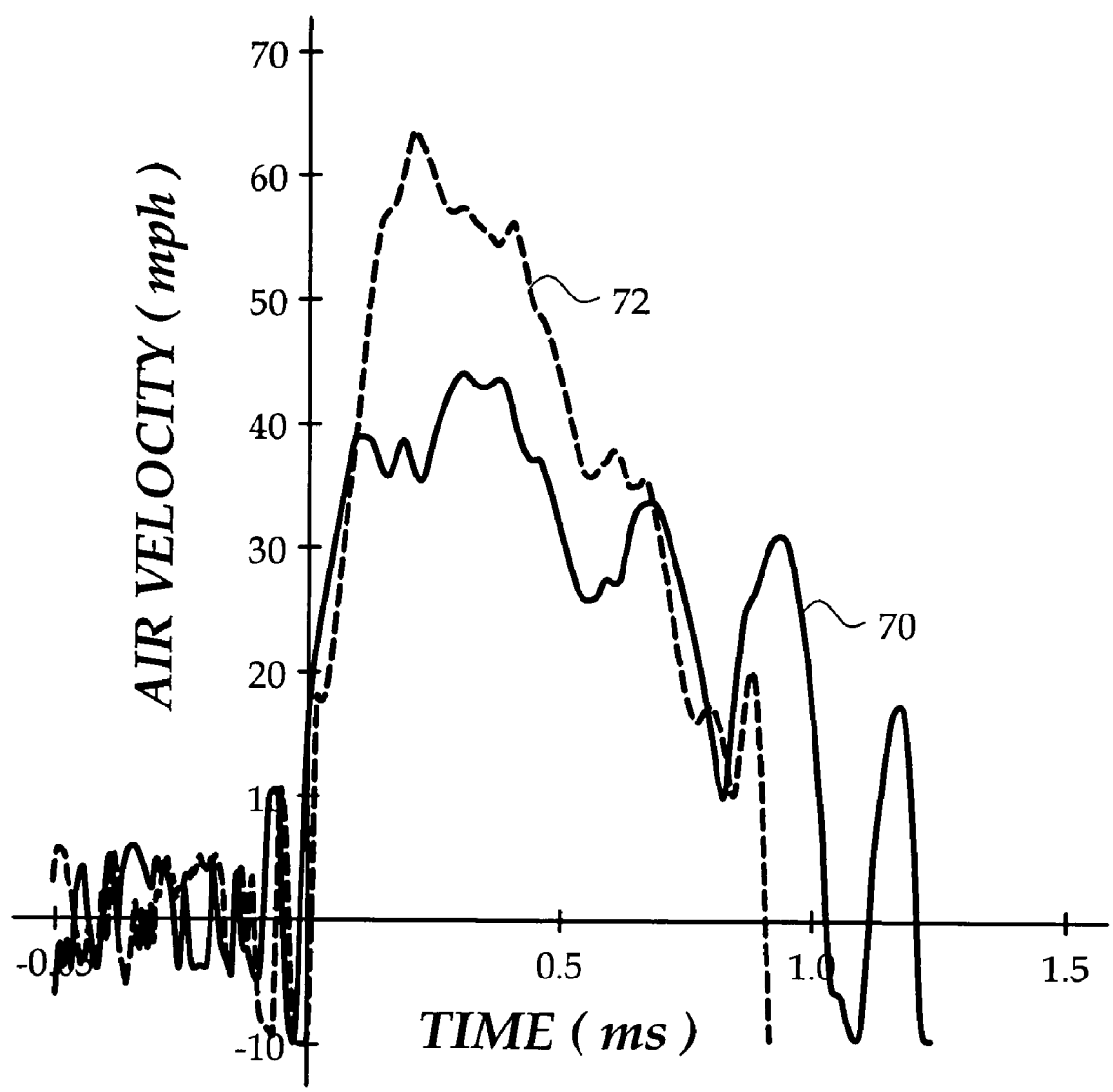
FIG. 3 is a graph depicting measured airflow vs. time for a mechanization of the present invention.

FIG. 3 represents airflow data collected in a mechanization of the present invention in which a Pitot tube airflow sensor was installed in a vehicle door substantially as described above in respect to FIG. 2C. The solid trace 70 represents data collected when the exterior body panel of the door was hit by a rubber mallet with relatively low force; and the broken trace 72 represents data collected when the body panel was hit by the same rubber mallet with high force. Although both impacts would be considered as abuse events in regard to deployment of supplemental restraints, the depicted data clearly demonstrates that the magnitude of the signal produced by the airflow sensor provides a predictable and reliable measure of impact severity. The decision as to whether deployment of one or more supplemental restraints is warranted for a given impact can be made by calibrating a fixed or time-variant threshold and deploying the restraint(s) if the measured airflow exceeds the threshold. The depicted data additionally demonstrates that the severity of an impact can be determined very quickly, enabling timely deployment of supplemental restraints for virtually any crash event.

Figure 4A:
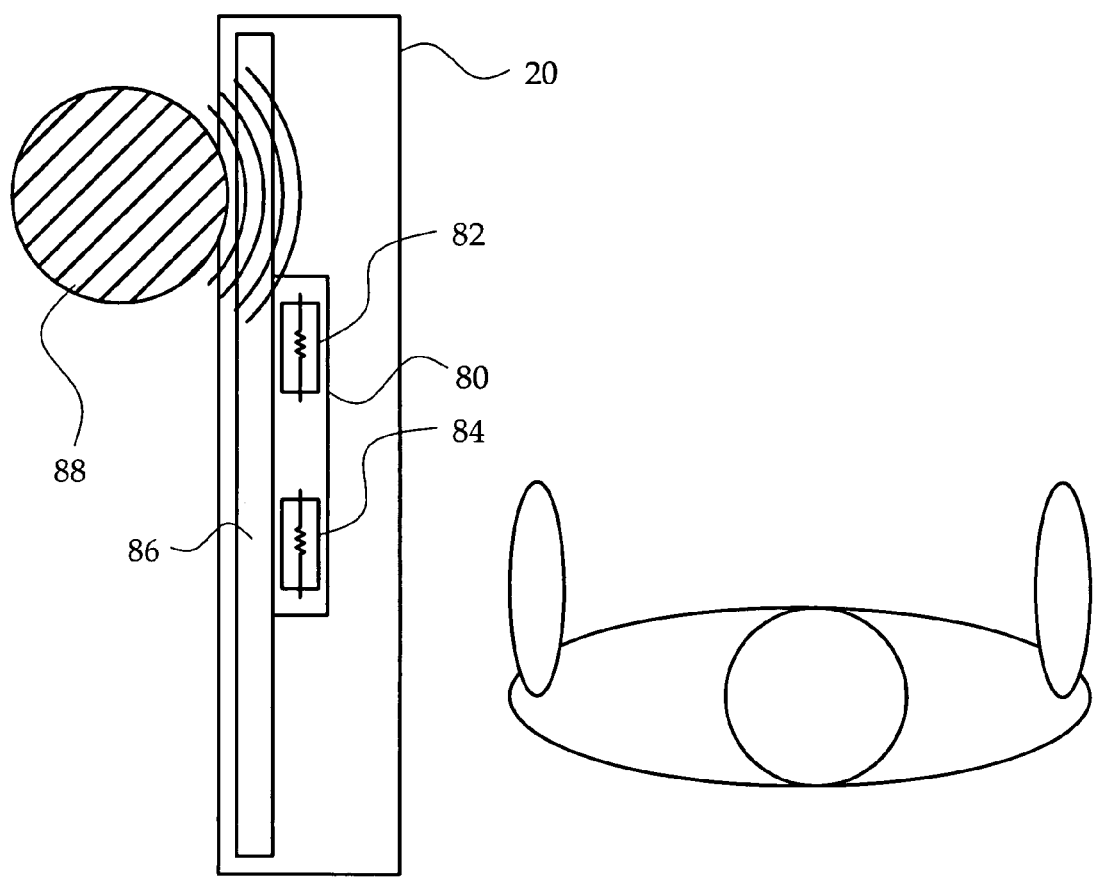
FIG. 4A is a diagram depicting a pole impact to a vehicle side door where the door is equipped with dual airflow sensors according to this invention.
Figure 5A:
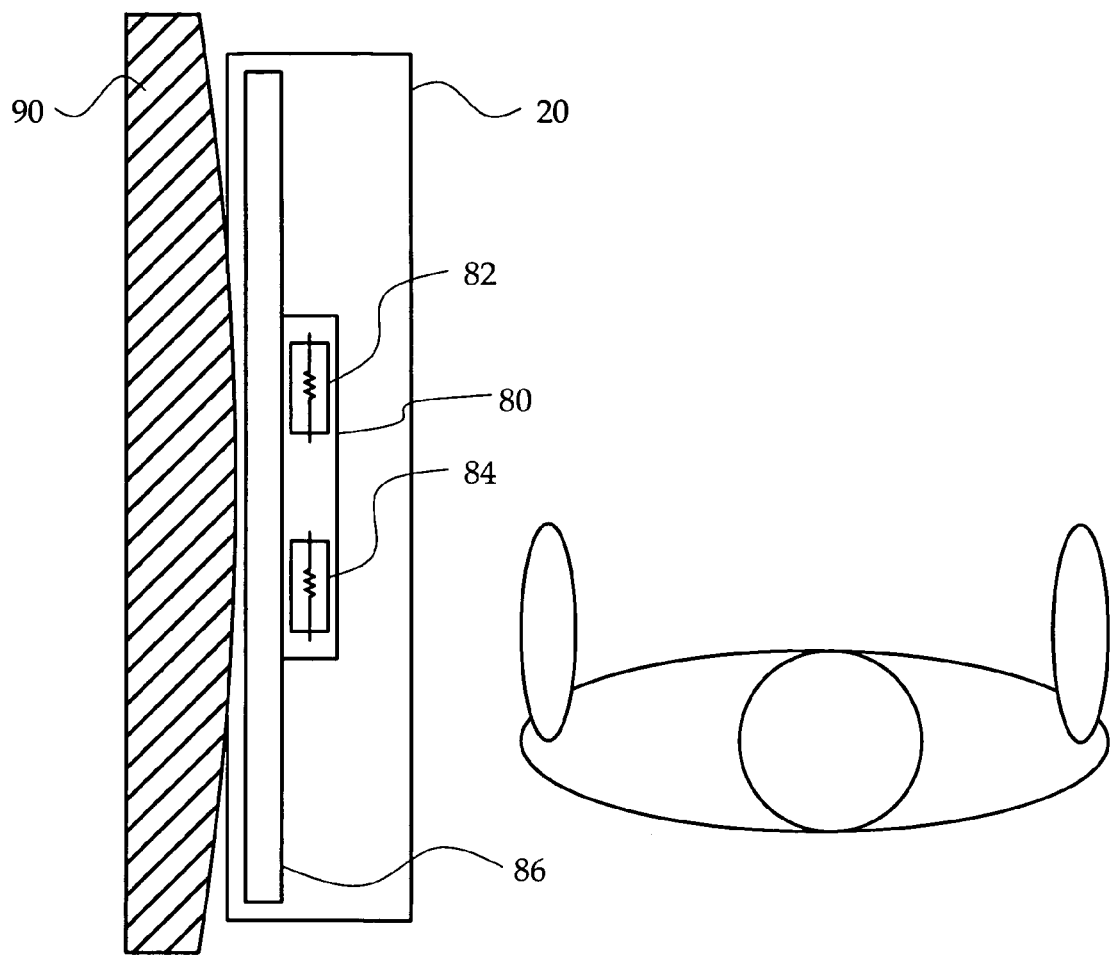
FIG. 5A is a diagram depicting a bumper impact to a vehicle side door where the door is equipped with dual airflow sensors according to this invention.

FIGS. 4A and 5A depict side impact mechanizations in which a satellite crash sensor module 80 including a pair of spaced airflow sensors 82, 84 is mounted in the vehicle side door 20, such that the sensor 82 is located forward of the sensor 84. In the illustrations, the module 80 is mounted on a structural beam 86 of the door 20. A similar mechanization may be used for frontal impact sensing; in that case, the sensors 82, 84 would be laterally distributed instead of longitudinally distributed.

Figure 4B:
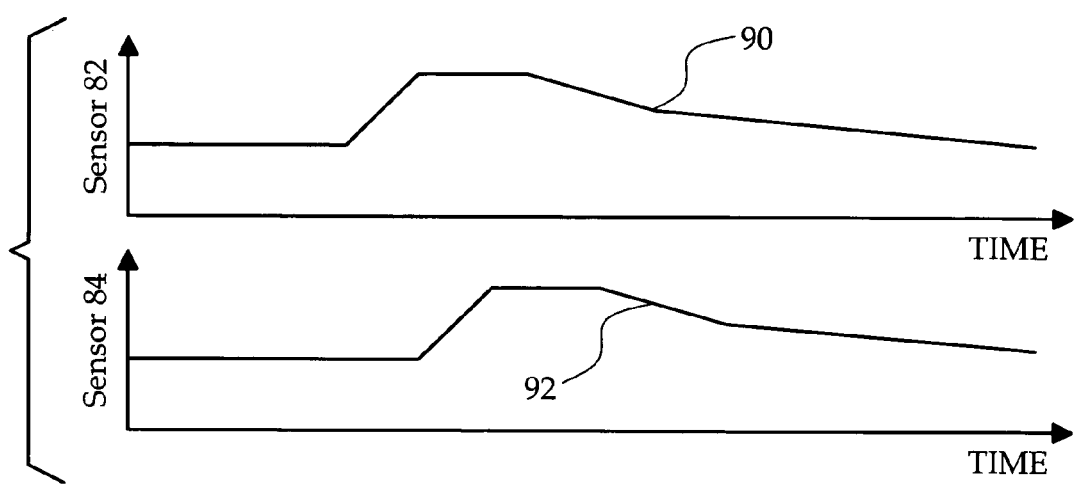
FIG. 4B graphically depicts outputs produced by the airflow sensors of FIG. 4A in response to the pole impact.

FIG. 4A depicts a localized side impact with an object such as a pole 88, and the resulting signals produced by the airflow sensors 82 and 84 are respectively depicted by the traces 90 and 92 of FIG. 4B. The traces 90 and 92 are similar in magnitude by skewed in time because the impact-related air movement affects the sensor 82 before it affects the sensor 84. Both sensors 82, 84 reflect the occurrence and severity of the impact; the time skewing reveals that the impact is localized and indicates the relative location of the impact.

Figure 5B:
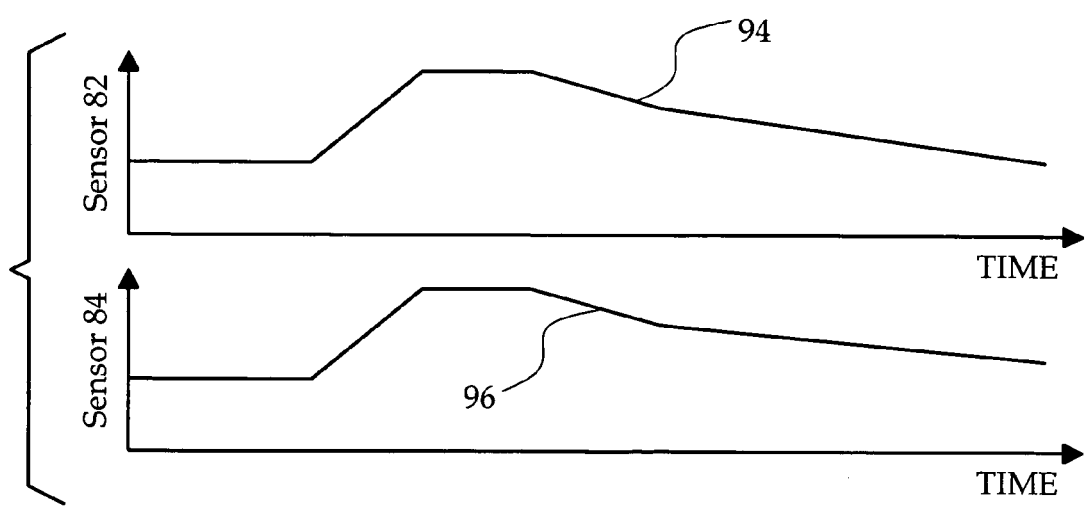
FIG. 5B graphically depicts outputs produced by the airflow sensors of FIG. 5A in response to the bumper impact.

FIG. 5A depicts a broad or wide-area impact with an object such as a bumper 90 of another vehicle, and the resulting signals produced by the air airflow displacement sensors 82 and 84 are respectively depicted by the traces 94 and 96 of FIG. 5B. In this case, the traces 94 and 96 are similar in both magnitude and time-space because the impact-related air movement affects the sensors 82, 84 substantially equally. Both sensors 82, 84 reflect the occurrence and severity of the impact, and their essential equivalency indicates an impact of broad extent.

In summary, the present invention provides a novel crash sensing approach that detects serious vehicle impacts both quickly and reliably by responding to a transient airflow inboard of a vehicle body panel that is struck by an object. The sensor output is inherently insensitive to non-crash events, while providing fast detection of true crash events. Since the sensor is responsive to transient airflow, it does not need to be located in a closed or sealed cavity such as a door; this broadens the applicability of the sensing approach to different types of impacts and installations.

While the present invention has been described with respect to the illustrated embodiments, it is recognized that numerous modifications and variations in addition to those mentioned herein will occur to those skilled in the art. For example, the functions of SDM 28 and ACM 30 may carried out by a single module if desired. Also, a vehicle may be equipped with more or fewer airflow sensors than shown, and one or more airflow sensors may be installed in other vehicle locations than shown, and may be mounted on various body structures, such as on an inner door panel. Particularly in the case of side impact sensing, the airflow sensor(s) may be mounted in a location that is responsive to impacts that occur over a wide area of the vehicle body, or in a door cavity vent, for example. Accordingly, it is intended that the invention not be limited to the disclosed embodiments, but that it have the full scope permitted by the language of the following claims.

The invention claimed is:

1. A method of impact detection for a vehicle, comprising the steps of:
   measuring an airflow inboard of a vehicle body panel due to an impact to said body panel wherein the step of measuring said airflow includes the steps of establishing a first air passage having an inlet that is aligned with a direction of said airflow, establishing a second air passage having an inlet that is perpendicular to said direction of airflow, measuring a differential pressure between said first air passage and said second air passage, and determining the measured airflow based upon the differential pressure; and
   processing the measured airflow to detect said impact and determine its severity.

2. The method of claim 1, wherein said vehicle body panel is an exterior panel of a vehicle side door.

3. The method of claim 1, wherein said vehicle body panel is a bumper of said vehicle.

4. The method of claim 1, including the steps of:
   measuring a first airflow at a first location inboard of said vehicle body panel;
   measuring a second airflow at a second location inboard of said vehicle body panel, said second location being displaced from said first location along an axis of said vehicle; and
   processing the first and second measured airflows to determine an extent of said impact.

5. The method of claim 1, including the steps of:
   measuring a first airflow at a first location inboard of said vehicle body panel;
   measuring a second airflow at a second location inboard of said vehicle body panel, said second location being displaced from said first location along an axis of said vehicle; and
   processing the first and second measured airflows to determine a location of said impact relative to said first and second locations.

6. Impact detection apparatus for a vehicle, comprising:
   a first sensor disposed inboard of a vehicle body panel for determining airflow due to an impact to said body panel, wherein said first sensor is a Pitot tube including a first air passage having an inlet that is aligned with a direction of said airflow, a second air passage having an inlet that is perpendicular to said direction of airflow, and a differential pressure sensor coupled between said first and second air passages; and processing means for processing the determined airflow to detect said impact and determine its severity, wherein the processing means is configured to determine the determined airflow based upon a differential pressure measured by the differential pressure sensor.

7. The apparatus of claim 6, where said vehicle body panel is an exterior panel of a vehicle side door.

8. The apparatus of claim 6, where said vehicle body panel is a bumper of said vehicle.

9. The apparatus of claim 6, further comprising:

a second sensor disposed inboard of said vehicle body panel for determining airflow at a location displaced from said first sensor along an axis of said vehicle; and processing means for processing the determined airflows to determine an extent of said impact.

10. The apparatus of claim 6, further comprising:

a second sensor disposed inboard of said vehicle body panel for determining airflow at a location displaced from said first sensor along an axis of said vehicle; and processing means for processing the determined airflows to determine a location of said impact relative to said first and second sensors.

* * * * *